United States Patent
Gonioukh et al.

(10) Patent No.: US 10,472,428 B2
(45) Date of Patent: *Nov. 12, 2019

(54) HIGH-PRESSURE POLYMERIZATION PROCESS OF ETHYLENICALLY UNSATURATED MONOMERS CARRED OUT IN A POLYMERIZATION REACTOR INSTALLED WITHIN A PROTECTIVE ENCLOSURE

(71) Applicant: Basell Polyolefine GmbH, Wesseling (DE)

(72) Inventors: Andrei Gonioukh, Erfstadt (DE); Thomas Herrmann, Cologne (DE); Dieter Littmann, Muecke (DE); Andre-Armand Finette, Cologne (DE); Siegfried Mischok, Bruehl (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/300,177

(22) PCT Filed: May 9, 2017

(86) PCT No.: PCT/EP2017/060975
§ 371 (c)(1),
(2) Date: Nov. 9, 2018

(87) PCT Pub. No.: WO2017/194493
PCT Pub. Date: Nov. 16, 2017

(65) Prior Publication Data
US 2019/0169318 A1    Jun. 6, 2019

(30) Foreign Application Priority Data
May 10, 2016 (EP) .................................. 16168994

(51) Int. Cl.
*C08F 2/00* (2006.01)
*C08F 10/02* (2006.01)
(Continued)

(52) U.S. Cl.
CPC ............. *C08F 2/01* (2013.01); *C08F 2/34* (2013.01); *C08F 10/02* (2013.01); *C08F 2400/02* (2013.01)

(58) Field of Classification Search
CPC ...................................... C08F 2/01; C08F 2/34
(Continued)

(56) References Cited

U.S. PATENT DOCUMENTS 7,192,561 B2    3/2007  Groos et al.
8,187,546 B2 *  5/2012  Barbero ................ B01J 3/008
                                                    422/131
(Continued)

FOREIGN PATENT DOCUMENTS

CN    102281943 A    12/2011
EP    2732852 A1     5/2014
(Continued)

OTHER PUBLICATIONS

H. Bönsel and G. Luft, Chemie Ingenieur Technik, vol. 67, Issue 7, pp. 862-864, Jul. 1995.
(Continued)

*Primary Examiner* — Rip A Lee (57) ABSTRACT

A process for polymerizing or copolymerizing ethylenically unsaturated monomers at pressures in the range of from 110 MPa to 500 MPa in a production line comprising a continuously operated polymerization reactor which is installed within a protective enclosure, wherein the production line is monitored with respect to an occurrence of a leakage of monomers or of reaction mixture and a water based deluge system, which provides droplets of a diameter in a range (Continued)

from 25 μm to 20 mm to the enclosed area, is automatically started with a minimum flow rate of 10 L/min per m² of enclosed area when a leakage of monomers or of reaction mixture is detected.

20 Claims, 3 Drawing Sheets (51) Int. Cl.
*C08F 2/01* (2006.01)
*C08F 2/34* (2006.01)

(58) Field of Classification Search
USPC .................................... 526/64, 59, 60, 901
See application file for complete search history.

(56) References Cited

U.S. PATENT DOCUMENTS

| 8,217,124 | B2 | 7/2012 | Littmann et al. |
| 8,433,443 | B2 | 4/2013 | Hagerty et al. |
| 9,273,162 | B2* | 3/2016 | Weiand ................... C08F 10/02 |
| 9,441,057 | B1* | 9/2016 | Littmann ............... C08F 110/02 |
| 9,631,035 | B2* | 4/2017 | Groos ...................... C08J 11/02 |
| 9,840,567 | B2 | 12/2017 | Fouarge et al. |
| 9,908,950 | B2* | 3/2018 | Wolfram .............. B01J 19/0006 |
| 9,931,608 | B2* | 4/2018 | Littmann ................ C08F 2/004 |
| 10,220,230 | B2* | 3/2019 | Gueret ..................... A62C 3/06 |
| 2003/0206835 | A1* | 11/2003 | Donck ................. B01J 19/2415 422/132 |
| 2013/0274424 | A1 | 10/2013 | Weiand et al. |
| 2014/0058050 | A1* | 2/2014 | Tracht .................. B01J 19/0033 526/59 |
| 2014/0288248 | A1* | 9/2014 | Berthalter ............... C08F 10/00 526/64 |
| 2015/0238791 | A1 | 8/2015 | Gueret et al. |

FOREIGN PATENT DOCUMENTS

| JP | H11173971 A | 7/1999 | |
| JP | 2004-501754 A | 1/2004 | |
| WO | 02/01308 A2 | 1/2002 | |
| WO | 2008100368 A1 | 8/2008 | |
| WO | 2008111755 A1 | 9/2008 | |
| WO | WO 2008/111755 * | 9/2008 | ............. G08B 21/16 |
| WO | 20080148758 A1 | 12/2008 | |
| WO | 2014114646 A1 | 7/2014 | |

OTHER PUBLICATIONS

The International Search Report and Written Opinion for PCT/EP2017/060975 dated Jun. 14, 2017.

* cited by examiner

HIGH-PRESSURE POLYMERIZATION PROCESS OF ETHYLENICALLY UNSATURATED MONOMERS CARRED OUT IN A POLYMERIZATION REACTOR INSTALLED WITHIN A PROTECTIVE ENCLOSURE

FIELD OF THE INVENTION

The present disclosure provides a process for polymerizing or copolymerizing ethylenically unsaturated monomers at temperatures from 100° C. to 350° C. and pressures in the range of from 110 MPa to 500 MPa in a production line comprising a continuously operated polymerization reactor which is installed within a protective enclosure.

BACKGROUND OF THE INVENTION

Polyethylene is the most widely used commercial polymer and can be prepared by a couple of different processes. Polymerization in the presence of free-radical initiators at elevated pressures was the first method used to obtain polyethylene and continues to be a valued process with high commercial relevance for the preparation of low density polyethylene (LDPE).

A common set-up of a production line for preparing low density polyethylene comprises a polymerization reactor, which can be an autoclave or a tubular reactor or a combination of such reactors, and additional equipment. For pressurizing the reaction components, usually a set of two compressors, a primary compressor and a secondary compressor, is used. At the end of the polymerization sequence, a production line for high-pressure polymerization normally further includes apparatuses like extruders and granulators for pelletizing the resulting polymer. Furthermore, such a production line may comprise means for feeding monomers and comonomers, free-radical initiators, modifiers or other substances at one or more positions to the polymerization reaction.

A characteristic of the radically initiated polymerization of ethylenically unsaturated monomers under high pressure is that the conversion of the monomers is by far not complete. For every pass of the reactor or the reactor combination, only about 10% to 50% of the dosed monomers are converted in polymerizations in a tubular reactor and from 8% to 30% of the dosed monomers are converted in polymerizations in an autoclave reactor. The resulting reaction mixture usually leaves the reactor through a pressure control valve and is then may be separated into polymeric and gaseous components with the unreacted monomers being recycled. To avoid unnecessary decompression and compression steps, the separation into polymeric and gaseous components may be carried out in at least two stages. The monomer-polymer mixture leaving the reactor can be transferred to a first separating vessel, frequently called high-pressure product separator, in which the separation in polymeric and gaseous components is carried out at a pressure that allows for recycling of the ethylene and comonomers separated from the monomer-polymer mixture to the reaction mixture at a position between the primary compressor and the secondary compressor. At the conditions of operating the first separation vessel, the polymeric components within the separating vessel are in liquid state. The liquid phase obtained in the first separating vessel is transferred to a second separation vessel, frequently called a low-pressure product separator, in which a further separation into polymeric and gaseous components takes place at lower pressure. The ethylene and comonomers separated from the mixture in the second separation vessel are fed to the primary compressor where they are compressed to the pressure of the fresh ethylene feed, combined with the fresh ethylene feed and the joined streams are further pressurized to the pressure of the high-pressure gas recycle stream.

The polymerization process in a LDPE reactor is carried out at high pressures which can reach 350 MPa. Such high pressure may require special technology for the process to be handled in a safe and reliable manner. Technical issues in handling ethylene at high pressures are, for example, described in Chem. Ing. Tech. 67 (1995), pages 862 to 864. It is stated that ethylene decomposes rapidly in an explosive manner under certain temperature and pressure conditions to give soot, methane and hydrogen. This undesired reaction occurs repeatedly in the high-pressure polymerization of ethylene. The drastic increase in pressure and temperature associated therewith represents a considerable potential risk for the operational safety of the production plants.

A possible solution for preventing a drastic increase in pressure and temperature of this type involves installing rupture discs or emergency pressure-relief valves. WO 02/01308 A2, for example, discloses a specific hydraulically controlled pressure relief valve which allows a particularly fast opening of the pressure relief valve in case of sudden changes in pressure or temperature. It is technically possible to handle such thermal runaways or explosive decompositions of ethylene within the polymerization reactor, however these situations are highly undesirable since thermal runaways or explosive decompositions of ethylene within the polymerization reactor lead to a shut-down of the polymerization plant with frequent emission of ethylene into the environment and loss of production.

Another threat to the operational safety of high-pressure polymerization plants is the occurrence of leaks. Due to the high pressure difference between the interior of the polymerization reactor and the surroundings, even small fissures in a wall of high-pressure equipment may lead to an exit of a considerably high amount of the reactor content resulting in locally high concentrations of combustible hydrocarbons in a short time period. On the other hand, in the case of larger leaks, the available time for reacting is extremely short. Depending on the size and the position of the leak, the leakage rate of combustible or explosive gases may be extremely high.

Furthermore, in processes for preparing ethylene polymers at high pressure, the reaction mixture may comprise a supercritical composition comprising monomer and polymer. After a leakage of such a reaction mixture into the atmosphere, small polymer particles are formed which are subject to electrostatic charging. Consequently, there is an enhanced probability for an ignition after an explosive gas cloud has developed after an escape of the reaction mixture.

It is common in chemical and petrochemical plants to monitor the surroundings of such plants with respect to the leakage of combustible gases by gas detectors. Gas detectors are devices that detect the presence of gases in an area, often as part of a safety system. This type of equipment is commonly used to detect a gas leak and can interface with a control system so a process can be automatically shut down. A gas detector can also sound an alarm to operators in the area where the leak is occurring, giving them the opportunity to leave. Gas detectors can be used to detect combustible, flammable and toxic gases, and oxygen depletion. Common gas sensors include infrared point sensors, ultrasonic sensors, electrochemical gas sensors, and semiconductor sensors. More recently, infrared imaging sensors have come into use. These sensors are used for a wide range of applications and can be found in industrial plants, refineries, waste-water treatment facilities, vehicles, and homes.

After detection of a leakage of monomers or reaction mixture, it is possible to interrupt the polymerization process and depressurize the polymerization plant or parts of the polymerization plant. However, until the leakage is detected a critical amount of combustible or explosive gases may have been released and the leakage does not end until the plant is fully depressurized.

EP 2 732 852 A1 discloses a method to mitigate the consequences of a vapor cloud explosion due to an accidental release of a flammable gas in an open area, in which a flame acceleration suppression product is released in a defined hazardous area at a rate that is determined as a function of the volume of the hazardous area. EP 2 732 852 A1 describes that the flame acceleration suppression products is preferably a dry powder of a radical capturing salt. The powder may be supplied by a carrier gas, e.g. nitrogen.

There is a need to overcome the disadvantages of the prior art and provide a process which include fast and effective steps to reduce the probability that a leaked gas cloud could explode within an enclosed area and to mitigate the negative effects of explosions which may occur.

SUMMARY OF THE INVENTION

The present disclosure provides a process for polymerizing or copolymerizing one or more ethylenically unsaturated monomers at temperatures from 100° C. to 350° C. and pressures in the range of from 110 MPa to 500 MPa in a production line comprising a continuously operated polymerization reactor which is installed within a protective enclosure, the process comprising
monitoring the production line with respect to an occurrence of a leakage of monomers or of reaction mixture, and
automatically starting a water based deluge system, which provides droplets of a diameter in a range from 25 μm to 20 mm to the enclosed area when a leakage of monomers or of reaction mixture is detected, and the droplets are provided with a minimum flow rate of 10 L/min per m2 of enclosed area.

In some embodiments, the droplets are provided to at least 10% of the enclosed area.

In some embodiments, the water based deluge system operates by providing water.

In some embodiments, the water based deluge system operates by providing a solution of radical capturing salts.

In some embodiments, the polymerization is carried out in a production line in which the monomers are brought to the polymerization pressure by one or more compressors in a sequence of compression stages in which the compressed gas mixture is cooled after each compression stage by a compression stage cooler, the compressed monomers are optionally passed through a pre-heater or a pre-cooler, and transferred into the polymerization reactor which is optionally cooled by cooling jackets, a reaction mixture obtained by the polymerization is leaving the reactor through a pressure control valve and optionally cooled by an post reactor cooler, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line, and the gaseous components separated off in a second stage at an absolute pressure in the range of from 0.1 to 0.5 MPa are recycled to the first stage of the sequence of compression stages via a low-pressure gas recycle line, and the polymeric components obtained by the polymerization are transformed into pellets.

In some embodiments, the polymerization reactor, the pressure control valve, the high-pressure product separator and, if present, the pre-heater or pre-cooler and the post reactor cooler are installed within the protective enclosure.

In some embodiments, the minimum flow rate of the droplets is achieved not later than 30 seconds after detecting a leakage of monomers or of reaction mixture.

In some embodiments, a steam based deluge system is started automatically in parallel with the water based deluge system.

In some embodiments, the steam based deluge system is operated by a feeding steam having a pressure from 0.3 MPa to 4 MPa.

In some embodiments, the steam based deluge system is operated by feeding pressurized water having a temperature from 140° C. to 220° C. into the protective enclosure.

In some embodiments, water, which has been used as a cooling medium for removing the heat of polymerization from the reaction mixture, is fed into the protective enclosure.

In some embodiments, the pressurized water having a temperature from 140° C. to 220° C. is permanently circulated in a closed loop through a pipeline, which is installed from 2 to 20 m above the floor of the protective enclosure and which is equipped with nozzles for releasing the water when a leakage of monomers or of reaction mixture is detected.

In some embodiments, the steam based deluge system is shut down 20 seconds after the water based deluge system has become fully active.

In some embodiments, the monitoring of the production line with respect to an occurrence of a leakage occurs by employing IR open path detectors, IR point detector or ultrasonic detectors, or combinations thereof in the surroundings of the production line or by monitoring the reaction conditions.

In some embodiments, an emergency pressure release program is automatically started in parallel with the water based deluge system.

DETAILED DESCRIPTION OF THE INVENTION

The present disclosure refers to a process for polymerizing or copolymerizing ethylenically unsaturated monomers in a continuously operated polymerization reactor at temperatures from 100° C. to 350° C. and pressures in the range of from 110 MPa to 500 MPa. The present disclosure refers to such a process, in which the polymerization reactor is installed within a protective enclosure.

In some embodiments, the high-pressure polymerization is a homopolymerization of ethylene or a copolymerization of ethylene with one or more other monomers, provided that these monomers are free-radically copolymerizable with ethylene under high pressure. Examples of copolymerizable monomers for use in the present technology are α,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or anhydrides, including methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, including vinyl acetate, can be used as comonomers. Propene, 1-butene, 1-hexene, acrylic acid, n-butyl acrylate, tert-butyl acrylate, 2-ethylhexyl acrylate, vinyl acetate or vinyl propionate may be used as the comonomer.

In the case of copolymerization, the proportion of comonomer or comonomers in the reaction mixture is from 1 to 50% by weight, such as from 3 to 40% by weight, based on the amount of monomers, i.e. the sum of ethylene and other monomers. Depending on the type of comonomer, in some embodiments the comonomers may be fed at more than one point to the reactor set-up. In certain embodiments, the comonomers are fed to the suction side of the secondary compressor.

For the purposes of the present disclosure, polymers or polymeric materials are substances which are made up of at least two monomer units. The polymers or polymeric materials may be low density polyethylenes having an average molecular weight $M_n$ of more than 20 000 g/mole. The term "low density polyethylene" includes ethylene homopolymers and ethylene copolymers. The process of the present disclosure can also be employed in the preparation of oligomers, waxes and polymers having a molecular weight $M_n$ of less than 20 000 g/mole.

The process of the present disclosure is, in some embodiments, a radical polymerization carried out in the presence of free-radical polymerization initiators. Possible initiators for starting the polymerization in the respective reaction zones are in general any substances that can produce radical species under the conditions in the polymerization reactor, for example, oxygen, air, azo compounds or peroxidic polymerization initiators. In one embodiment of the disclosure, the polymerization is carried out by using oxygen, either fed in the form of pure $O_2$ or as air. In case of initiating the polymerization with oxygen, the initiator may first be mixed with the ethylene feed and then fed to the reactor. In such a case it is not only possible to feed a stream comprising monomer and oxygen to the beginning of the polymerization reactor but also to one or more points along the reactor creating two or more reaction zones. Initiation using organic peroxides or azo compounds also represents an embodiment of the present disclosure. Examples of organic peroxides for use in the present technology are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-sec-butyl peroxydicarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, may also be used. It is possible to use either individual initiators or mixtures of various initiators. A large range of initiators, including peroxides, are commercially available, for example the products of Akzo Nobel offered under the trade names Trigonox® or Perkadox®.

Peroxidic polymerization initiators for use in the present disclosure are 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, di-(2-ethylhexyl)peroxydicarbonate or tert-butyl peroxy-2-ethylhexanoate.

The initiators can be employed individually or as a mixture in concentrations of from 0.1 mol/t to 50 mol/t of polyethylene produced, such as from 0.2 mol/t to 20 mol/t, in each reaction zone. In one embodiment of the present disclosure, the free-radical polymerization initiator, which is fed to a reaction zone, is a mixture of at least two different azo compounds or organic peroxides. If such initiator mixtures are used, these mixtures may be fed to all reaction zones. There is no limit for the number of different initiators in such a mixture, however the mixtures may be composed of from two to six initiators, including two, three or four different initiators. In some embodiments, the mixtures of initiators have different decomposition temperatures.

In certain embodiments, the initiators are used in a dissolved state. Examples of solvents for use in the present disclosure are ketones and aliphatic hydrocarbons, including octane, decane and isododecane and other saturated $C_8$-$C_{25}$-hydrocarbons. The solutions comprise the initiators or initiator mixtures in proportions of from 2 to 65% by weight, such as from 5 to 40% by weight and from 8 to 30% by weight.

In the high-pressure polymerization, the molecular weight of the polymers to be prepared can be altered by the addition of modifiers which act as chain-transfer agents. Examples of modifiers for use in the present technology are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. In certain embodiments, saturated aliphatic aldehydes such as propionaldehyde or 1-olefins such as propene, 1-butene or 1-hexene, or aliphatic hydrocarbons such as propane are used.

The high-pressure polymerization can be carried out at pressures of from 110 MPa to 500 MPa, including pressures of from 160 MPa to 350 MPa and from 200 MPa to 330 MPa, for polymerization in a tubular reactor and with pressures of from 110 MPa to 300 MPa, such as from 120 MPa to 280 MPa, for polymerization in an autoclave reactor. The polymerization temperatures are in the range of from 100° C. to 350° C., such as from 180° C. to 340° C. and from 200° C. to 330° C. for polymerization in a tubular reactor, and from 110° C. to 320° C. and from 120° C. to 310° C. for polymerization in an autoclave reactor.

The polymerization can be carried out with all types of high-pressure reactors appropriate for high-pressure polymerization. High-pressure reactors for use in the present technology are, for example, tubular reactors or autoclave reactors. In certain embodiments, the polymerization is carried out in one or more tubular reactors or one or more autoclave reactors or combinations of such reactors. In additional embodiments of the present disclosure, the polymerization reactor is a tubular reactor.

In some embodiments, high-pressure autoclave reactors for use with the present disclosure include stirred reactors and have a length-to-diameter ratio in a range from 2 to 30, such as from 2 to 20. Such autoclave reactors have one or more reaction zones, including from 1 to 6 reaction zones and from 1 to 4 reaction zones. The number of reaction zones depends on the number of agitator baffles which separate individual mixed zones within the autoclave reactor. In production lines in which the polymerization or the first polymerization is carried out in an autoclave reactor, i.e. in production lines in which the only polymerization reactor is an autoclave reactor or in production lines in which the first reactor of a reactor cascade is an autoclave reactor, the reaction mixture coming from the compressors may first be passed through a pre-cooler before entering the autoclave reactor.

Appropriate tubular reactors are basically long, thick-walled pipes, which may be from about 0.5 km to 4 km, from 1 km to 3 km and from 1.5 km to 2.5 km long. The inner diameter of the pipes can be in the range of from about 30 mm to 120 mm and from 60 mm to 100 mm. In some embodiments, the tubular reactors have a length-to-diameter ratio of greater than 1000, such as from 10000 to 40000 and from 25000 to 35000. In certain embodiments, the tubular reactor is composed of tubes of a length from 5 m to 25 m, including from 10 m to 22 m and from 15 m to 20 m. The individual tubes of the tubular reactor are, in certain embodiments, flanged together. The tubes can also be flanged to a bend, such as to a 1800 bend, for producing a small radius, i.e. have a ratio $R/d_o$ of 4 or less, with "R" being the radius of curvature of the bending and "$d_o$" being the outer diameter of the tube, for saving space. In an embodiment of the present disclosure, the flanges are arranged such that groups of flanges are aligned on top of each other. In additional embodiments, such a group of flanges is arranged one atop of the other and has at least two flanges, such as from 3 to 100 flanges and from 5 to 60 flanges.

In some embodiments, tubular reactors for use with the present disclosure have at least two reaction zones, including from 2 to 6 reaction zones and from 2 to 5 reaction zones. The number of reaction zones is given by the number of feeding points for the initiator. Such a feeding point can, for example, be an injection point for a solution of azo compounds or organic peroxides. Fresh initiator is added to the reactor, where the initiator decomposes into free radicals and initiates further polymerization. The generated heat of the reaction raises the temperature of the reaction mixture, since more heat is generated than can be removed through the walls of the tubular reactor. The rising temperature increases the rate of decomposition of the free-radical initiators and accelerates polymerization until the free-radical initiator is consumed. Thereafter, no further heat is generated and the temperature decreases again since the temperature of the reactor walls is lower than that of the reaction mixture. Accordingly, the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature rises and accordingly allows for adjusting that value. In some embodiments, the temperature rise is set to be in the range of from 70° C. to 170° C. in the first reaction zone and 50° C. to 130° C. for the subsequent reaction zones depending on the product specifications and the reactor configuration. In certain embodiments, the tubular reactor is equipped with cooling jackets for removing the heat of the reaction. In further embodiments, all reaction zones of the tubular reactor are cooled by cooling jackets.

In some embodiments, the compression of the reaction gas composition to the polymerization pressure is carried out by one or more compressors in a sequence of compression stages, where a primary compressor first compresses the reaction gas composition to a pressure of from 10 MPa to 50 MPa and a secondary compressor, which is sometimes designated as hyper compressor, further compresses the reaction gas composition to the polymerization pressure of from 110 MPa to 500 MPa. In certain embodiments, the primary compressor and the secondary compressor are multistage compressors. It is further possible to separate one or more stages of one or both of these compressors and divide the stages into separated compressors. However, in additional embodiments a series of one primary compressor and one secondary compressor is used for compressing the reaction gas composition to the polymerization pressure. In such cases, sometimes the whole primary compressor is designated as primary compressor. However, it is also common to designate the one or more first stages of the primary compressor, which compress the recycle gas from the low-pressure product separator to the pressure of the fresh ethylene feed, as the booster compressor and then only the one or more subsequent stages as the primary compressor, although the booster compressor and the subsequent stages are all part of one apparatus. After each of the compression stages, the compressed gas mixture is cooled by a compression stage cooler to remove the heat of compression. In further embodiments, the compression stage coolers are operated in way that the temperature of the compressed gas mixtures is below 130° C.

In one embodiment of the present disclosure, the production line comprises a pre-heater upstream of the tubular reactor for heating the reaction gas composition to a temperature capable of initiating the polymerization. In certain embodiments, the pre-heater is composed of tubes of a length from 5 m to 25 m, such as from 10 m to 22 m and from 15 m to 20 m. In some embodiments, the individual tubes of the pre-heater are flanged together. The tubes can also be flanged to a bend, such as to a 1800 bend. Such 180° bends have a small radius, i.e. have a ratio $R/d_o$ of 4 or less. In one embodiment of the present disclosure, the flanges are arranged such that groups of flanges are aligned on top of each other. In additional embodiments, such a group of flanges arranged one atop of the other has at least two flanges, such as from 3 to 50 flanges and from 5 to 30 flanges.

In one embodiment of the present disclosure, the entire reaction gas composition provided by the secondary compressor is fed via a pre-heater to the inlet of a tubular reactor. In another embodiment of the present disclosure, only a part of the reaction gas composition compressed by the secondary compressor is fed via the pre-heater to the inlet of the tubular reactor and the remainder of the reaction gas composition compressed by the secondary compressor is fed as one or more side streams to the tubular reactor downstream of the inlet of the tubular reactor. In such a set-up, in some embodiments from 30 to 90% by weight, including from 40 to 70% by weight, of the reaction gas composition provided by the secondary compressor are fed to the inlet of the tubular reactor and from 10 to 70% by weight, such as from 30 to 60% by weight, of the reaction gas composition provided by the secondary compressor are fed as one or more side streams to the tubular reactor downstream of the inlet of the tubular reactor.

The production line for carrying out the polymerization of the present disclosure comprises, beside the polymerization reactor, two or more gas recycle lines for recycling unreacted monomers into the polymerization process. The reaction mixture obtained in the polymerization reactor is transferred to a first separation vessel, frequently called high-pressure product separator, and separated into a gaseous fraction and a liquid fraction at an absolute pressure of from 15 MPa to 50 MPa. The gaseous fraction withdrawn from the first separation vessel is fed via a high-pressure gas recycle line to the suction side of the secondary compressor. In the high-pressure gas recycle line, the gas may be purified by several purifications steps for removing undesired components such as entrained polymer or oligomers. In some embodiments, the liquid fraction withdrawn from the first separation vessel, which may still comprise dissolved monomers such as ethylene and comonomers in an amount of 20 to 40% of weight, is transferred to a second separation vessel, frequently called low-pressure product separator, and further separated, at reduced pressure, such as at an absolute pressure in the range of from 0.1 to 0.5 MPa, in polymeric and gaseous components. The gaseous fraction withdrawn from the second separation vessel is fed via a so-called low-pressure gas recycle line to the primary compressor, such as to the foremost of the stages. Also, the low-pressure gas recycle line may comprise several purification steps for purifying the gas from undesired components. The production line can further comprise additional separation steps for separating reaction mixtures into gaseous [BNH1] fractions and additional gas recycle lines for feeding unreacted monomers to one of the compressors, for example in-between the first separation step and the second separation step operating at an intermediate pressure.

In some embodiments, the recycled gas coming from the low-pressure gas recycle line is compressed by first stages of the primary compressor to the pressure of the fresh feed of ethylenically unsaturated monomers, such as ethylene, thereafter combined with the fresh gas feed and the combined gases are further compressed in the primary compressor to the pressure of from 10 MPa to 50 MPa. In certain embodiments, the primary compressor comprises five or six compression stages, two or three before adding the fresh gas and two or three after adding the fresh gas. The secondary compressor has, in some embodiments, two stages; a first stage, which compresses the gas from about 30 MPa to about 120 MPa, and a second stage, which further compresses the gas from about 120 MPa to the final polymerization pressure.

The pressure within the polymerization reactor may be controlled by a pressure control valve, which is arranged at the outlet of the polymerization reactor and through which the reaction mixture leaves the reactor. The pressure control valve can be any valve arrangement which is suitable for reducing the pressure of the reaction mixture leaving the reactor to the pressure within the first separation vessel.

In one embodiment of the present disclosure, the production line comprises a post reactor cooler downstream of the polymerization reactor for cooling the reaction mixture. The post reactor cooler can be arranged upstream of the pressure control valve or the post reactor cooler can be arranged downstream of the pressure control valve. In certain embodiments, the post reactor cooler is arranged downstream of the pressure control valve. The post reactor cooler may be composed of tubes of a length from 5 m to 25 m, including from 10 m to 22 m and from 15 m to 20 m. In further embodiments, the individual tubes of the tubular reactor are flanged together. The tubes can also be flanged to a bend, such as to a 1800 bend. Such 180° bends have a small radius, i.e. a ratio $R/d_o$ of 4 or less. In one embodiment of the present disclosure, the flanges are arranged such that groups of flanges are aligned on top of each other. In certain embodiments, such a group of flanges arranged one atop of the other has at least two flanges, such as from 3 to 80 flanges and from 5 to 60 flanges.

The polymeric components obtained by the polymerization are finally transformed into pellets, normally by apparatuses like extruders or granulators.

Figure 1:
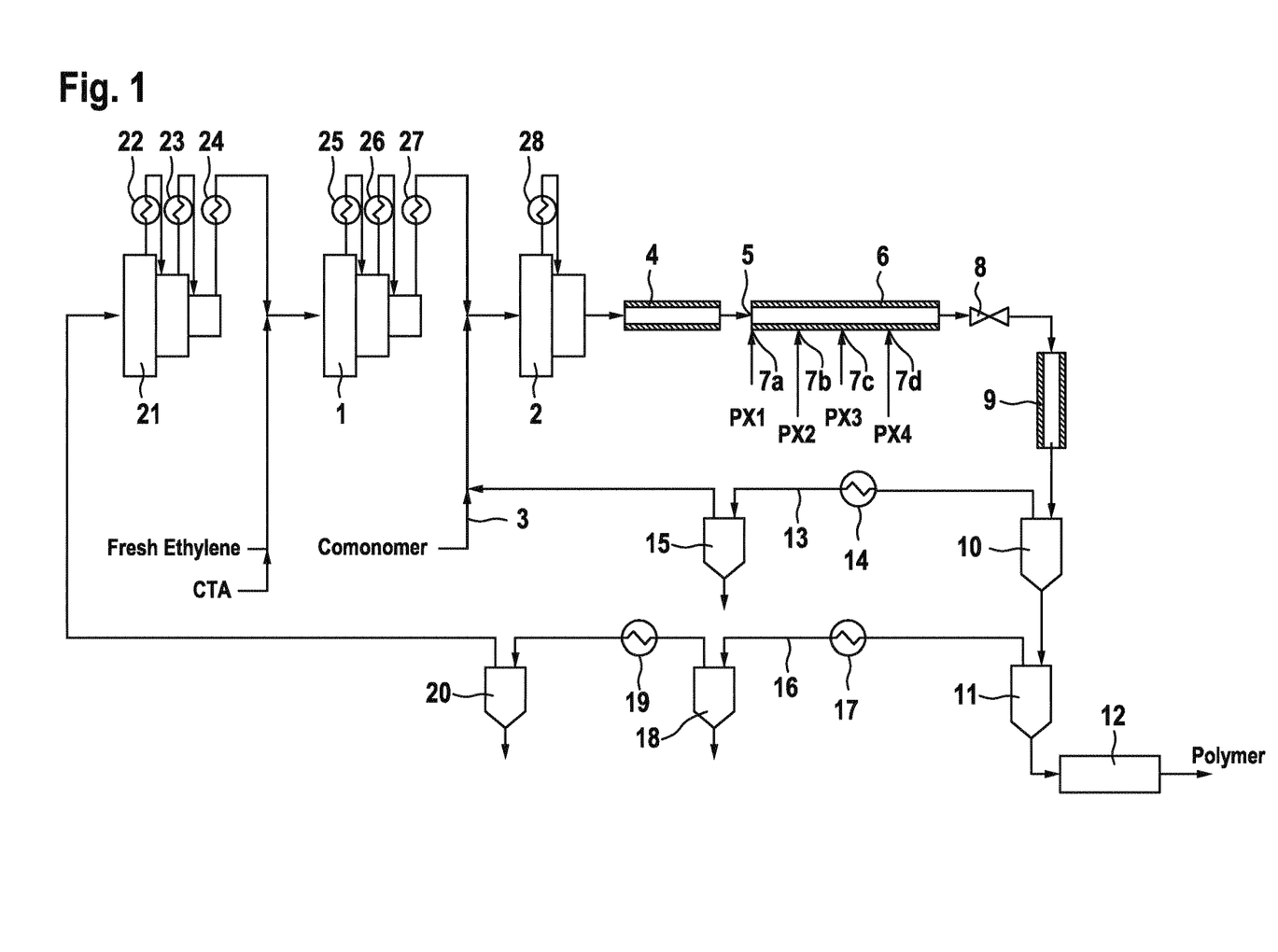
FIG. 1 shows schematically a set-up for carrying out the process of the present disclosure.

FIG. 1 shows schematically a set-up of a production line for polymerizing ethylenically unsaturated monomers in a production line comprising a continuously operated tubular polymerization reactor.

The fresh ethylene, which may be under a pressure of 1.7 MPa, is firstly compressed to a pressure of about 30 MPa by means of a primary compressor (1) and then compressed to the reaction pressure of about 300 MPa using a secondary compressor (2). A chain transfer agent (CTA) may be added to primary compressor (1) together with the fresh ethylene. The comonomer may be added upstream of the secondary compressor (2) via line (3). The reaction mixture leaving the primary compressor (2) is fed to pre-heater (4), where the reaction mixture is preheated to the reaction start temperature of from about 120° C. to 220° C., and then conveyed to the inlet (5) of the tubular reactor (6).

The tubular reactor (6) is basically a long, thick-walled pipe with cooling jackets to remove the liberated heat of reaction from the reaction mixture by means of a coolant circuit (not shown).

The tubular reactor (6) shown in FIG. 1 has four spatially separated initiator injection points (7a), (7b), (7c), and (7d) for feeding initiators or initiator mixtures PX1, PX2, PX3 and PX4 to the reactor and accordingly also four reaction zones. By feeding free-radical initiators in accordance with the present disclosure, e.g. those which decompose at the temperature of the reaction mixture, to the tubular reactor the polymerization reaction starts.

The reaction mixture leaves the tubular reactor (6) through a pressure control valve (8) and passes a post reactor cooler (9). Thereafter, the resulting polymer is separated off from unreacted ethylene and other low molecular weight compounds (monomers, oligomers, polymers, additives, solvent, etc.) by means of a first separation vessel (10) and a second separation vessel (11), discharged and pelletized via an extruder and granulator (12).

The ethylene and comonomers which have been separated off in the first separation vessel (10) are fed back to the inlet end of the tube reactor (6) in the high-pressure circuit (13) at about 30 MPa. In the high-pressure circuit (13), the gaseous material separated from the reaction mixture is first freed from other constituents in at least one purification stage and then added to the monomer stream between the primary compressor (1) and the secondary compressor (2). FIG. 1 shows one purification stage consisting of a heat exchanger (14) and a separator (15). It is however also possible to use a plurality of purification stages. The high-pressure circuit (13) is capable of separating waxes.

The ethylene which has been separated off in the second separation vessel (11), which further comprises, inter alia, the major part of the low molecular weight products of the polymerization (oligomers) and the solvent, is worked up in the low-pressure circuit (16) at an absolute pressure of from about 0.1 to 0.5 MPa in a plurality of separators with a heat exchanger being installed between each of the separators. FIG. 1 shows two purification stages consisting of heat exchangers (17) and (19) and separators (18) and (20). It is however also possible to use only one purification stage or more than two purification stages. The low-pressure circuit (16) is capable of separating oils and waxes.

The ethylene which has passed the low-pressure circuit (16) is fed to a booster compressor (21), compressed to a pressure of about 4 MPa and then conveyed to primary compressor (1). Booster compressor (21) and primary compressor (1) are, in some embodiments, part of one low-pressure compressor, i.e. of one apparatus powered by one motor. The gas mixtures compressed in the individual stages of the booster compressor (21), the primary compressor (1) and the secondary compressor (2) are cooled after every stage by heat exchanges (22), (23), (24), (25), (26), (27), and (28).

Different configurations for a tubular polymerization reactor in accordance with the present disclosure are also possible. In an embodiment, the monomers are not only added at the inlet of the reactor tube but the monomers are also fed, which are optionally cooled, at a plurality of different points to the reactor. In certain embodiments, this is may be done at the beginning of further reaction zones and if oxygen or air is used as initiator, which may be added to the monomer feed in the primary compressor.

The polymerization reactor and optionally further parts of the production line are installed within a protective enclosure. Such a protective enclosure, which may be constructed from concrete and is frequently called a "reactor bay", surrounds the polymerization reactor and other parts of the production line which are subjected to a high pressure for safety reasons. The protective enclosure protects the surrounding areas, inter alia, against overpressure, radiations and missile effects in case of the ignition of an accidental release of ethylene or other hydrocarbons. Such protective enclosures are, in certain embodiments, open to the sky. In certain embodiments, the polymerization reactor, the pressure control valve, the high-pressure product separator and, if present, the pre-heater or pre-cooler and the post reactor cooler are installed within the protective enclosure. The area within the protective enclosure is monitored with respect to an occurrence of a leakage of monomers or of reaction mixture.

The process of the present disclosure is characterized in that a water based deluge system is started automatically within the area enclosed by the protective enclosure when a leakage of monomers or of reaction mixture is detected. The water based deluge system provides to the enclosed area droplets having a diameter in a range from 25 m to 20 mm with a minimum flow rate of 10 L/min per $m^2$ of enclosed area. That means the amount of liquid provided by these droplets having a diameter in the range from 25 m to 20 mm is at least 10 L/min per $m^2$ of enclosed area. In some embodiments, the water based deluge system provides effective water droplets having a diameter in the range from 200 m to 5 mm, or effective water droplets having a diameter in the range from 300 m to 4 mm.

In certain embodiments, the minimum flow rate of the effective water droplets is 14 L/min per $m^2$ of enclosed area, including 18 L/min per $m^2$ of enclosed area.

For achieving an even distribution of the droplets within the protective enclosure, the droplets are provided to at least 10% of the enclosed area, including to at least 90% of the enclosed area. The droplets may be created by spraying through at least 1 nozzle per 10 $m^2$ of enclosed area, including through at least 3 nozzles per 10 $m^2$ of enclosed area and through at least 5 nozzles per 10 $m^2$ of enclosed area, into the protective enclosure.

The diameter of the droplets provided to the area enclosed by the protective enclosure can for example be determined by laser-based disdrometers operating according to the extinction principle. For calculating the flow rate of droplets having a diameter in a chosen range, the total liquid flow rate is determined and multiplied with the ratio of the generated volume of droplets having a diameter in the chosen range to the volume of all droplets generated by spraying the liquid into the protective enclosure.

The curtain of droplets provided by the process of the present disclosure is able to effectively reduce the overpressure in case of an explosion. In certain embodiments, droplets having a diameter in the range from 25 μm to 200 μm, such as from 25 μm to 100 μm, are capable of mitigating the effect of an explosion. These small droplets possess a large surface to volume ratio. Therefore these small droplets will immediately evaporate when they are exposed to the temperature wave of the explosion. The evaporation of water requires a substantial amount of energy, which is thereby absorbed from the explosion and the hazardous potential is decreased. The overpressure within the protective enclosure and consequently the pressure acting on the enclosure walls are reduced.

Accordingly, in one embodiment of the present disclosure, droplets having a diameter in the range from 25 m to 200 m are generated and provided to the enclosed area. For fire protection in buildings, high-pressure water mist systems are available. These systems require a pressure generating device, e.g. a piston pump, for delivering water with a pressure often above 3.5 MPa to specially designed nozzles. These nozzles are designed such that very small droplets are created, having diameters, e.g. from 25 μm to 200 μm.

According to one embodiment of the present disclosure, droplets having a diameter in the range from 200 μm to 20 mm are provided to the enclosed area. These droplets are able to mitigate the consequences of an explosion and to absorb the energy of the overpressures. In the case of an explosion, droplets of more than 200 μm in diameter are deformed by the pressure wave to such an extent that the droplets break up, whereby lots of small droplets with diameters smaller than 100 μm are created. These small droplets have the capability of effectively mitigating the consequences of an explosion.

According to a further embodiment of the present disclosure, the water based deluge system operates by providing water. Thus, water droplets having a diameter in the range from 25 μm to 20 mm are sprayed to the enclosed area. Operating the water based deluge system by spraying water allows for setting up the system in principle simply with a water connection. Furthermore, using water avoids any contamination of the production line with unwanted materials.

According to another embodiment of the present disclosure, the water based deluge system operates by providing a solution of radical capturing salts. Thus, droplets of such a solution having a diameter in the range from 25 μm to 20 mm are sprayed to the enclosed area. Examples of radical capturing salts are potassium bicarbonate, sodium bicarbonate, sodium chloride or sodium carbonate. In some embodiments, the solution of radical capturing salts is an aqueous solution of potassium bicarbonate or an aqueous solution of sodium bicarbonate. This allows that the solution can be supplied by standard systems for providing droplets, and that upon evaporation of the water droplets due to an explosion, fine powders of the radical capturing salt are formed. This combines two advantageous effects: a) the evaporation of the droplets takes out the heat of the explosion, thereby reducing the reaction rate of the radical chain reactions and b) the powder of the radical capturing salt is created, which further slows down the radical chain reactions. It is advantageous that the size of the powder can be controlled by the size of the droplets by choosing adequate nozzles and the mass fraction of the radical capturing salt in the aqueous solution.

In additional embodiments, the minimum flow rate of the droplets is achieved not later than 30 seconds after detecting a leakage of monomers or of reaction mixture. In some embodiments, the minimum flow rate of the effective water droplets is achieved not later than 20 seconds after detecting a leakage of monomers or of reaction mixture.

For establishing a fully developed spray pattern, the water based deluge system needs about 10 to 15 seconds in which water pressure is built-up in the pipings and the droplet curtain is formed. The water based deluge system may therefore be combined with a faster starting system for minimizing the probability that a leaked gas cloud explodes and the negative effects of explosions which may possibly occur. Such a faster starting system is, in some embodiments, a steam based deluge system. Thus, according to an embodiment of the present disclosure, a steam based deluge system is started automatically in parallel with the water based deluge system.

The steam based deluge system can be operated by feeding steam having a pressure from 0.3 to 4 MPa, such as from 0.4 to 3 MPa. After being injected into the protective enclosure, the pressurized water vapor will expand, replace oxygen containing air and dilute the possibly explosive gas cloud.

In further embodiments, the steam based deluge system is operated by feeding pressurized water having a temperature from 140° C. to 220° C., such as from 160° C. to 200° C., into the protective enclosure. As such, the pressurized water is above its boiling point at atmospheric conditions and will instantaneously evaporate when released.

In additional embodiments, the steam based deluge system feeds pressurized water into the protective enclosure, which has been used as a cooling medium for removing the heat of polymerization from the reaction mixture, for example by circulating through cooling jackets. This water is available in sufficient quantities in a production line for the polymerization of ethylenically unsaturated monomers, where the pressurized water is used for taking away the liberated heat of polymerization.

In one embodiment of the present disclosure, the pressurized water is provided by permanently circulating water having a temperature from 140° C. to 220° C. in a closed loop through a pipeline, which is installed from 2 to 20 m above the floor of the protective enclosure and which is equipped with nozzles for releasing the water when a leakage of monomers or of reaction mixture is detected. Such closed cycles may be installed in different heights, for example one loop at the a height of 2 m and one loop at a height of 6 m. Alternatively, pipings which connect the cooling jackets of the polymerization reactor could be provided with fast opening valves for releasing the cooling medium.

In one embodiment of the present disclosure, the steam based deluge system is shut down 15 seconds after the water based deluge system has become fully active. In this context, having become fully active means that the water based deluge system provides droplets with the minimum flow rate for at least 20 seconds, such as at least 15 seconds and at least 10 seconds after the minimum flow rate has been reached. Shutting down the steam based deluge system after the water based deluge system has become fully active limits the amount of steam or hot pressurized water which needs to be kept ready and, if the pressurized water comes from the cooling system, saves resources for a timely restart of the production line.

The detection of a leakage of monomers or of reaction mixture from the production line can occur by monitoring the surroundings of the production line or by monitoring the reaction conditions. The monitoring of the surrounding of the production line can be a monitoring of the surroundings of the production line with respect to the concentration of hydrocarbons or can be another surveillance of the surroundings, for example by ultrasonic detectors, or by combinations thereof.

IR detectors are spectroscopic sensors which are often used as gas detectors. IR detectors operate on the principle that infrared (IR) radiation of a certain wavelength is differently absorbed by different materials such as different gases. Hydrocarbon gases are especially suited to be monitored by IR measurement because of a strong IR absorption at wavelengths in the range from 3000 to 2750 $cm^{-1}$. IR detectors commonly include an infrared source (lamp), an optical filter which selectively transmits IR radiation of different wavelengths and an infrared detector. IR radiation of a wavelength which is specific for the material to be detected is directed through a sample towards the detector, which measures the attenuation with respect to a reference beam without absorption. Such IR detectors may be used to measure gas concentrations. For detecting combustible gases, two types of IR detectors are often employed, IR point detectors and IR open-path detectors. IR point detectors measure the attenuation of IR radiation within a sample chamber which is located within the IR point detector. IR open-path detectors have separated infrared source and detector and the beam of IR radiation may travel from a few meters up to a few hundred meters before reaching the IR detector.

In certain embodiments, the monitoring of the surrounding of the production line occurs by IR point detectors which are arranged in groups and at least three such groups of IR point detectors are employed for the monitoring. In further embodiments, the monitoring of the surrounding of the production line is carried out with from 3 to 50 groups of IR point detectors, such as from 4 to 30 groups of IR point detectors and from 6 to 20 groups of IR point detectors, forming an IR point detector arrangement. Each of the groups of IR point detectors of the IR point detector arrangement operates according to a voting logic and the water based deluge system is started when one of the groups of IR point detectors of the IR point detector arrangement detects the presence of hydrocarbons.

Each of the groups of IR point detectors of the IR point detector arrangement comprises at least two IR point detectors, including from 2 to 20 IR point detectors and efrom 2 to 10 IR point detectors.

In accordance with the present disclosure, operating a group of IR detectors according to a voting logic means that for starting the emergency pressure release program, at least a predefined number of IR detectors of the respective group of IR detectors has to detect hydrocarbons. In some embodiments, this predefined number is two. That means, for a group of IR detectors having two detectors, that both IR detectors have to detect the presence of hydrocarbons in the order that the water based deluge system is started; such a group operates consequently according to a two out of two (2oo2) logic. For a group of IR point detectors operating according to a 2oo2 logic, the IR point detectors may be arranged close to each other in a way that the distance between the two IR point detectors is, in some embodiments, at most 3 meters. For a group of IR detectors having three detectors, this means that at least two of the three IR detectors have to detect the presence of hydrocarbons in order that the water based deluge system is started; such a group operates consequently according to a two out of three (2oo3) logic. For a group of IR point detectors having N detectors, this means that at least two of N IR detectors have to detect the presence of hydrocarbons in order that the water based deluge system is started; and the group operates according to a two out of N (2ooN) logic. In case of larger groups of IR point detectors, it is further possible to operate with a 3ooN, a 4ooN or a XooN logic.

Detecting the presence of hydrocarbons means in the context of the present disclosure that the measured concentration of hydrocarbons rises above a pre-defined threshold value. Such a threshold value can, in some embodiments, be a certain proportion of the lower explosive limit (LEL), i.e. the lowest concentration of a gas or a vapor in air capable of producing a flash of fire in presence of an ignition source. A threshold value can, for example, be 20% LEL. That means, for a group of IR point detectors operating according to a 2ooN voting logic, the water based deluge system is started when the second IR point detector of the group of IR point detectors measures a hydrocarbon concentration above 20% LEL.

The polymerization reactor and optionally further parts of the production line are installed within a protective enclosure. In some embodiments, the area within the protective enclosure is monitored by the IR point detector arrangement or a part of the IR point detector arrangement. The protective enclosure further enhances the reliability of the IR point detector arrangement because the enclosure shields the IR point detectors from atmospheric interactions such as strong winds and the enclosure further limits the size of a developing gas cloud.

The IR point detectors of the arrangement of IR point detectors can be positioned in any functional layout. In one embodiment of the present disclosure, the positioning of the IR point detectors is based on calculations of different leakage scenarios. This permits that an "as fast as possible" detection is achieved by a minimum number of IR point detectors.

The arrangement of IR point detectors can not only be employed for monitoring the surrounding of the production line, such as for the surrounding of the production line within a protective enclosure, but also for monitoring the surrounding of the compressors.

In some embodiments, the monitoring of the surrounding of the production line is carried out by a combination of the IR point detector arrangement according to the present disclosure and one or more IR open path detectors which are capable of detecting hydrocarbons. In one embodiment of the present disclosure, the additional monitoring occurs by individual IR open path detectors. The water based deluge system is then automatically started when a group of IR point detectors of the IR point detector arrangement operating according to a voting logic or one of the IR open path detectors detects the presence of hydrocarbons. In another embodiment of the present disclosure, the additional monitoring occurs by groups of IR open path detectors and the groups of IR open path detectors are operating according to a voting logic. The water based deluge system is then automatically started when a group of IR point detectors of the IR point detector arrangement operating according to a voting logic or a group of IR open path detectors operating according to a voting logic detects the presence of hydrocarbons.

IR open path detectors bring about the advantage that the IR detection path can be extended up to a few hundred meters and IR open path detectors are accordingly able to detect dispersed gas clouds. The IR open path detectors may be employed for monitoring areas within a protective enclosure or for monitoring very large areas.

According to a further embodiment of the present disclosure, the monitoring of the surrounding of the production line is carried out by a combination of the IR point detector arrangement and one or more ultrasonic detectors. It is also possible to carry out the monitoring of the surrounding of the production line by a combination of the IR point detector arrangement, one or more ultrasonic detectors and one or more IR open path detectors which are capable of detecting hydrocarbons. Ultrasonic detectors are sensors which measure the sound which is emitted by leaking of pressurized gas. Such a noise may be created when the pressure difference between the pressured gas and the surrounding is more than 0.7 MPa.

Ultrasonic detectors have the advantage that they are very fast as the measured signal travels by the speed of sound. However, ultrasonic sounds can also be created by other sources. Thus, according to one embodiment of the present disclosure, the IR point detector arrangement is employed for starting automatically the water based deluge system while the ultrasonic detectors are used to give an alarm signal. The ultrasonic detectors may, however, also be installed in a production line in a way that they reliably indicate leakage of combustible gases. Thus, according to another embodiment of the present disclosure, the water based deluge system is automatically started when a group of IR point detectors of the IR point detector arrangement detects the presence of hydrocarbons or an ultrasonic detector detects a gas leak. Ultrasonic detectors may be employed for monitoring the surroundings of the compressors or for monitoring non-jacketed pipelines such as supply lines for bringing ethylene to the production line.

According to a further embodiment of the present disclosure, in addition to monitoring of the surrounding of the production line by the IR point detector arrangement and optionally further sensors, at least one of the cooling media which cool the compression stage coolers, the cooling jackets of the polymerization reactor, the post reactor cooler or a cooler within the high-pressure or the low pressure gas recycle line is monitored with respect to an occurrence of a leakage of monomers or of reaction mixture into the cooling medium. In some embodiments, all these cooling media are monitored with respect to an occurrence of a leakage of monomers or of reaction mixture into the cooling medium. In certain embodiments, the monitoring of the cooling medium occurs by passing air through the cooling medium and thereafter conveying the air to an IR point detector capable of detecting hydrocarbons. Consequently, according to an embodiment of the present disclosure, the water based deluge system is automatically started when a group of IR point detectors of the IR point detector arrangement detects the presence of hydrocarbons or the IR point detector monitoring the air passed through the cooling medium detects the presence of hydrocarbons.

As the solubility of ethylene in water is very low, leakages to the cooling medium will form small gas bubbles within the coolant stream. In further embodiments, the cooling medium system is designed in a way that such bubbles are collected in designated regions. For example, a horizontal coolant piping section is equipped with a T-fitting which is introduced in such a manner that one arm of the fitting points upwards so that gas bubbles will rise into this section. Cooling medium from such a region may be conveyed to equipment which allows for the passing of air through the cooling medium, for example a small flash column. The air passing the cooling medium carries ethylene away from the cooling medium and a sample of the air is then led to an IR point detector. In one embodiment of the present disclosure, cooling medium sampling, air sampling, and monitoring are carried out redundantly, i.e. more than one cooling medium sample is taken and passed by air and each of these air samples is conveyed to a different IR point detector. When the sampling is carried out redundantly, in some embodiments the IR point detectors for monitoring the air samples operate according to a voting logic.

It is further possible to monitor the cooling medium of cooling systems which operate at ambient pressure by use of a fume hood construction above open parts of cooling systems such as open cooling medium return lines. The air above the open part of the cooling system, which may comprise leaked ethylene, may be conveyed by natural convection to a detector. Depending on the dilution of the ethylene in the air, this detector can be an IR point detector or a Flame Ionization Detector (FID).

According to one embodiment of the present disclosure, at least one of the pre-heater or pre-cooler, the polymerization reactor and the post reactor cooler is composed of tubes of a length from 5 m to 25 m which are flanged together, either directly or via bends, and the flanges are covered by a chimney construction, and wherein air is conveyed through the chimney construction and the air exiting the chimney construction is monitored with respect to the hydrocarbon concentration. In further embodiments, the polymerization reactor is a tubular reactor or a reactor cascade comprising a tubular reactor and the production line comprises a pre-heater and a post reactor cooler, and the pre-heater, the polymerization reactor and the post reactor cooler are composed of tubes of a length from 5 m to 25 m, which are flanged together, either directly or via bends, and the flanges are covered by a chimney construction. It is also possible in accordance with the present disclosure that the polymerization reactor is an autoclave reactor or a cascade of autoclave reactors and the production line comprises a pre-cooler or a post reactor cooler or a pre-cooler and a post reactor cooler, and the pre-cooler or the post reactor cooler or the pre-cooler and the post reactor cooler are composed of tubes of a length from 5 m to 25 m which are flanged together, either directly or via bends, and the flanges are covered by a chimney construction. Air is conveyed through the chimney construction and the air exiting the chimney construction is monitored with respect to the hydrocarbon concentration by one or more IR open path detectors or by an IR point detector which is supplied with air exiting the chimney construction.

In additional embodiments, all flanges of the production line are covered by a chimney construction. It is possible that each of the flanges is covered by a separate chimney construction, for instance at least 50% of the chimney constructions cover two or more flanges and each chimney construction covers two or more flanges. In some embodiments, each chimney construction covers from 2 to 100 flanges, such as from 3 to 80 flanges and from 5 to 60 flanges. In some embodiments a group of flanges, which are arranged one atop of the other, is covered by one chimney construction. In additional embodiments, the chimney construction is vertically orientated with openings at the bottom and at the top and the air, which is heated by the hot flanges, can rise by natural convention and exit the chimney construction at the top. It is also possible that one chimney construction has two or more "legs" which cover groups of vertically arranged flanges and, above the highest of the covered the flanges, the "legs" converge to one chimney.

The chimney construction can have any suitable form that encloses the flanges and allows transportation of gas through the construction. In certain embodiments, the chimneys of the chimney construction are closed structures; however, it is also possible that the chimney construction has not only one opening for the air to enter and one opening for the air to exit the chimney construction but the chimney construction is also not closed at one side, for example has a U-shape and is open to an adjacent wall if the flanges are arranged close to this wall.

As the flanges have a higher temperature than the air coming from the environment, the air is heated and rises by natural convection. The earlier leaked gas reaches a detector the shorter is the time period for detecting a leakage. In an embodiment of the present disclosure, the walls of the chimney construction are isolated in order to minimize heat losses to the exterior and maximize the uprising velocity of the air.

A further possibility to convey gas through a closed structure is to use fans or blowers. This allows for the building chimney constructions which are not vertically oriented. In some embodiments, however, natural convection or natural convection in combination with fans or blowers is employed to convey the air through the chimney constructions and the chimney constructions are vertically oriented. When using fans or blowers for conveying the air or supporting the natural convection, situations where the amount of air blown through the chimney constructions is so large that leaked gas is so diluted that the concentration remains below the detection limit should be avoided.

Figure 2:
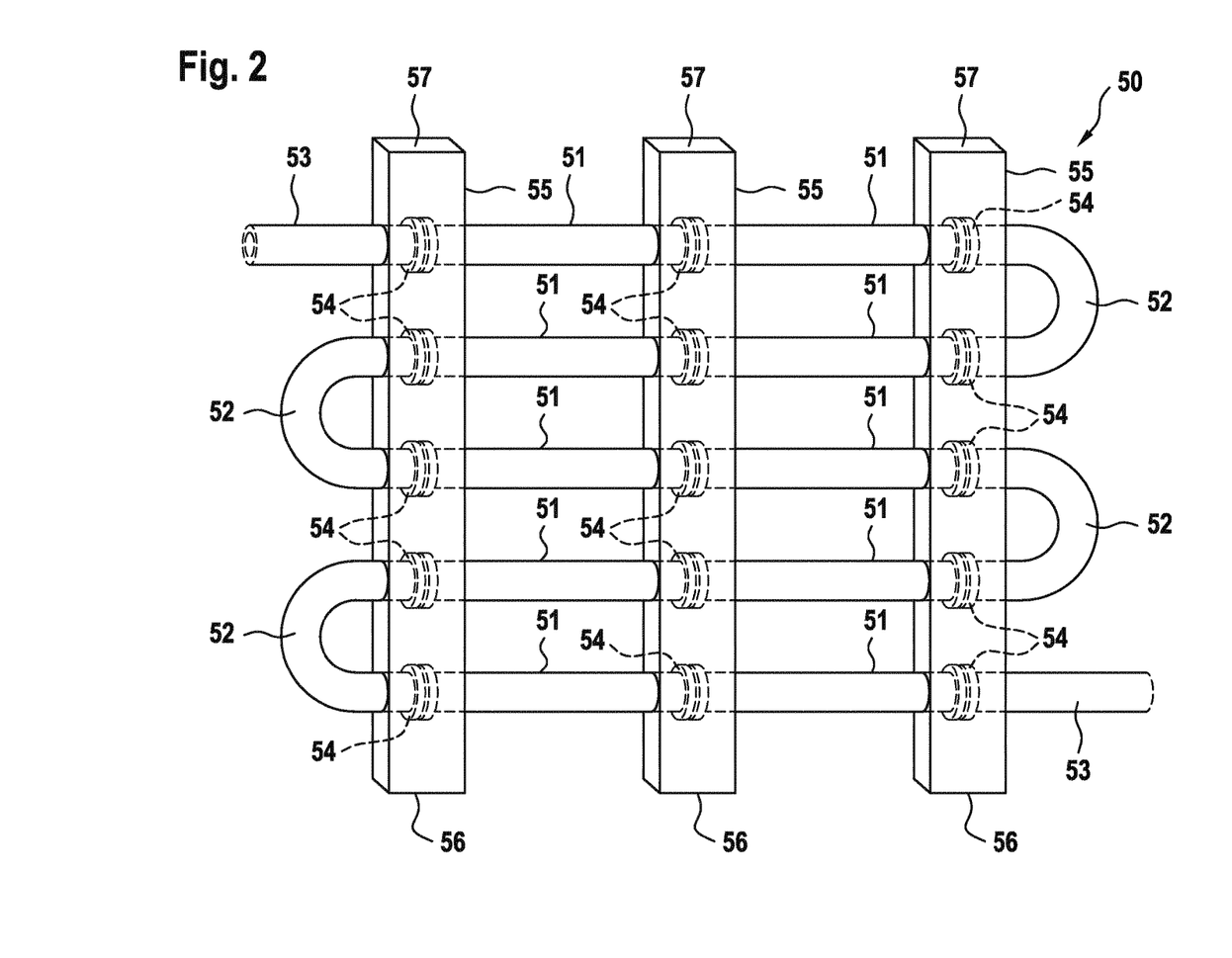
FIG. 2 shows schematically an arrangement of chimney constructions in a section of a tubular reactor.

FIG. 2 shows an arrangement of chimney constructions in which in a section (50) of a tubular reactor, five pairs of tubes (51) are arranged on top of each other and connected by bends (52). This section (50) of the tubular reactor is connected with other parts of the reactor by tubes (53). The flanges (54) are arranged on top of each other and covered by three chimney constructions (55) which are open at the bottom (56) and at the top (57) and in which air is conveyed by natural convection and exits the chimney constructions (55) at the top (57).

The chimney construction has the purpose to guide leaked gas to a gas detection system and to minimize the dilution of the leaked gas cloud. Thus, the less space there is between the flanges and the chimney walls, the higher the concentration of ethylene is in the uprising air. A high concentration of the gas to be detected is favorable because a detection threshold will be surpassed more quickly than for a more diluted gas cloud. Therefore, in certain embodiments a chimney design matching the flanges quite closely without obstructing the upward flow is used.

Figure 3:
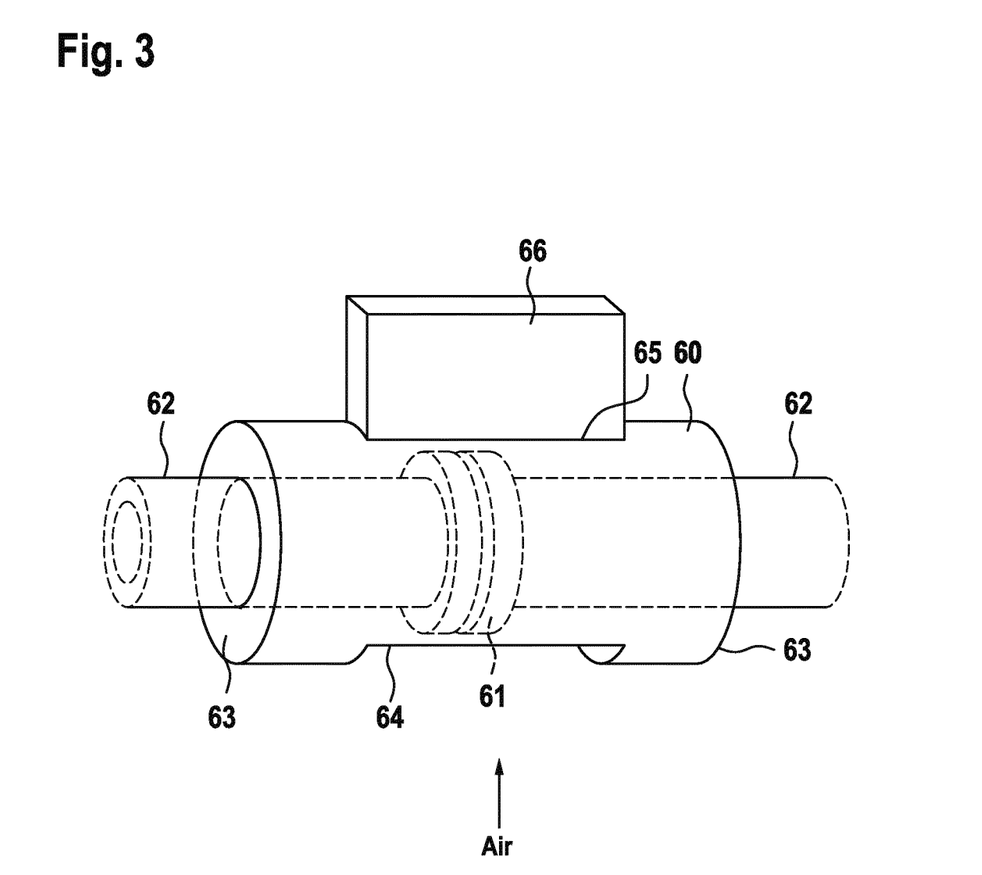
FIG. 3 shows schematically a chimney construction element covering one flange of a tubular reactor.

FIG. 3 shows a design of a chimney construction element (60) for one flange with a minimized internal volume. Chimney construction element (60) has a cylindrical form and covers a flange (61) for connecting two tubes (62). Chimney construction element (60) has two side walls (63) which each have a round opening of the diameter of the tubes (62) for the tubes (62) to pass. Chimney construction element (60) has further a rectangular opening (64) at the bottom and a rectangular opening (65) at the top. Chimney construction element (60) can by connected to identical construction elements arranged on top or below by rectangular connection elements (66) fitting into openings (64) and (65). Air can enter the chimney construction element (60) from below, leaves the chimney construction element (60) though opening (64) and can convey by natural convection through connection elements (66) into further chimney construction elements possibly installed above.

For monitoring the air exiting the chimney construction with respect to the hydrocarbon concentration, in some embodiments the air is monitored by one or more IR open path detectors or by an IR point detector.

When using IR open path detectors for monitoring the air exiting the chimney construction, it is possible that each chimney construction is equipped with one or more IR open path detectors designated for monitoring only air exiting one chimney construction. In one embodiment, the IR open path detectors are arranged in a way that each IR open path detector monitors air exiting more than one chimney construction. In further embodiments, the IR open path detectors are arranged in a matrix array in which at least 50% of the IR open path detectors monitor air exiting two or more chimney constructions and each stream of air exiting a chimney construction is monitored by at least three IR open path detectors. This allows for operating the IR open path detectors which monitor one chimney construction according to a voting logic.

Employing IR open path detectors for monitoring the air exiting the chimney construction brings about the advantage that it is highly probable that a leakage is detected even if the chimney is damaged, for example by a large leak with gas escaping at a high velocity. This is so because the IR open path detectors not only measure the areas above the exits of the chimney constructions but along the whole detection path and a large gas cloud coming from a damaged chimney construction has a high probability of crossing such a path.

Another option for monitoring the air exiting a chimney construction is employing an IR point detector. In some embodiments, the IR point detector is supplied by an aspiration line, with air coming from a location close to the opening through which the air exits the chimney construction. An aspiration line is equipment which conveys air from a specific position to a detector such as an IR point detector. In further embodiments, the air is conveyed through the aspiration line by an ejector or any other kind of suitable pump. It is also possible to employ one IR point detector for monitoring two or more chimney constructions. It is possible to combine two or more aspiration lines and monitor the combined air with respect to the hydrocarbon concentration. It is further possible to monitor the air coming from two or more aspiration lines subsequently. Then, a multiplexer can be used which switches in predefined intervals between the aspiration lines coming from different chimneys constructions. Employing an aspiration line for supplying the IR point detector with air coming from the chimney construction has the advantage that air is cooled down before arriving at the IR point detector. In an embodiment of the present disclosure, the aspiration lines are equipped with water traps for removing water, which may have been introduced by condensation or cooling water leakage, from the air before the air arrives at the IR point detector.

In one embodiment of the present disclosure, the detection of a leakage of monomers or of reaction mixture(s) from the production line occurs by monitoring the reaction conditions. The water based deluge system is automatically started when the pressure control valve closes more than a preset threshold value and at the same time the pressure within the polymerization reactor decreases below a preset pressure threshold. The feeding rate of secondary compressors as installed in high-pressure polymerization plants can often only be varied in very limited forms. That means, as long as the secondary compressor is operating, it presses essentially the nameplate amount of material into the polymerization reactor. In continuous operation, the pressure within the polymerization reactor can generally only be kept constant if the same amount of material leaves the reactor as is introduced into the reactor. That means for an individual high-pressure polymerization plant that, in steady state production, the valve opening of the pressure control valve remains essentially constant, while the degree of opening is specific for each individual combination of installed compressor set-up, pressure control valve and use of other feed streams. If the pressure control valve closes more than this specific valve opening, steady state conditions are left. Such a situation could occur if the reactor shuts down or if the plant transitions from one polymerization grade, which is produced at a lower pressure, to a polymerization grade, which is produced at a higher pressure. However, as long as the secondary compressor is still operating, this should correspond to an increase in the pressure within the polymerization reactor. If, in parallel to a decrease in the valve opening of the pressure control valve, a decrease in the pressure within the polymerization reactor is detected, this is an unambiguous indication of an uncontrolled leakage of reaction mixture from the polymerization reactor or from a piping at the discharge side of the secondary compressor.

The advantage of such monitoring of the reaction conditions is that it is possible to detect leaks in a high-pressure polymerization plant very fast because measuring pressure and monitoring the opening degree of a valve are very fast processes. Accordingly, it is possible to start the water based deluge system before significant amounts of the reaction mixture are leaked from the high-pressure part of the plant. The process of the present disclosure is very reliable and easy to implement in existing polymerization plants because all equipment, which is used to detect the leakage and to start the emergency shutdown program, is key equipment, which needs to be functional to operate the polymerization plant, and similarly all process parameters, which are employed for detecting the leakage, are key process parameters.

In one embodiment of the present disclosure, the polymerization reactor is a tubular reactor or comprises a tubular reactor and the polymerization process is carried out with briefly opening the pressure control valve at the reactor outlet at constant time intervals, i.e. that the polymerization reactor is kicked or bumped. The short pressure drops within the polymerization reactor induced by the kicking does not interfere with the leakage detection of the process of the present disclosure because this fall of the reactor pressure correlates with an opening of the pressure control valve.

The continuous monitoring of the pressure within the polymerization reactor can be performed at various positions of the polymerization reactor. Even in a tubular reactor, a pressure drop caused by a leakage of reaction mixture spreads fast enough through the reactor that all positions along the reactor tube are suitable for a very fast detection of leaks in a high-pressure polymerization plant. In some embodiments, the pressure is monitored at the inlet of the polymerization reactor, i.e. at the discharge side of the secondary compressor before the reaction mixture enters the polymerization reactor because polymer has not yet been formed at this position and accordingly the probability of a blockage of a pressure sensor by a polymer layer is minimized. Furthermore, the pressure variations caused by the constant brief openings of the pressure control valve are less pronounced at the inlet of the polymerization reactor than in the vicinity of the pressure control valve and hence the mechanical stress for the pressure sensor and consequently the risk of a failure of this component are reduced.

In one embodiment of the present disclosure, an emergency pressure release program is automatically started in parallel with the water based deluge system. The emergency pressure release program may be a pre-implemented procedure in which the whole polymerization plant or only parts of the polymerization plant are depressurized or partly depressurized and the polymerization process is interrupted. For releasing the content of the reactor including pre-heater or pre-cooler and post reactor cooler and the content of the secondary compressor including high-pressure gas recycle line and high-pressure product separator to the atmosphere, the production line is equipped with one or more emergency pressure release valves. These emergency pressure release valves may be installed along a tubular reactor or in the high-pressure gas recycle line or both along a tubular reactor and in the high-pressure gas recycle line. The depressurization of the polymerization reactor can occur via the one or more emergency pressure release valves or via the pressure control valve or a combination of emergency pressure release valves and pressure control valve. In certain embodiments, the depressurization of the polymerization reactor occurs via the one or more emergency pressure release valves.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

What is claimed is:

1. A process for polymerizing or copolymerizing one or more ethylenically unsaturated monomers at temperatures from 100° C. to 350° C. and pressures in the range of from 110 MPa to 500 MPa in a production line comprising a continuously operated polymerization reactor which is installed within a protective enclosure, the process comprising monitoring the production line with respect to an occurrence of a leakage of monomers or of reaction mixture, and automatically starting a water based deluge system, which provides droplets of a diameter in a range from 25 µm to 20 mm to an enclosed area when a leakage of monomers or of reaction mixture is detected, and the droplets are provided with a minimum flow rate of 10 L/min per $m^2$ of enclosed area.

2. The process of claim 1, wherein the droplets are provided to at least 10% of the enclosed area.

3. The process of claim 1, wherein the water based deluge system operates by providing water.

4. The process of claim 1, wherein the water based deluge system operates by providing a solution of radical capturing salts.

5. The process of claim 1, wherein polymerizing or copolymerizing is carried out in a production line in which the monomers are brought to polymerization pressure by one or more compressors in a sequence of compression stages in which a compressed gas mixture is cooled after each compression stage by a compression stage cooler, compressed monomers are optionally passed through a pre-heater or a pre-cooler, and transferred into the polymerization reactor which is optionally cooled by cooling jackets, a reaction mixture obtained by polymerizing or copolymerizing is leaving the polymerization reactor through a pressure control valve and optionally cooled by an post reactor cooler, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line, and the gaseous components separated off in a second stage at an absolute pressure in the range of from 0.1 to 0.5 MPa are recycled to a first stage of the sequence of compression stages via a low-pressure gas recycle line, and the polymeric components obtained by polymerizing or copolymerizing are transformed into pellets.

6. The process of claim 5, wherein the polymerization reactor, the pressure control valve, a high-pressure product separator and, if present, the pre-heater or pre-cooler and the post reactor cooler are installed within the protective enclosure.

7. The process of claim 1, wherein the minimum flow rate of the droplets is achieved not later than 30 seconds after detecting a leakage of monomers or of reaction mixture.

8. The process of claim 1, wherein a steam based deluge system is started automatically in parallel with the water based deluge system.

9. The process of claim 8, wherein the steam based deluge system is operated by a feeding steam having a pressure from 0.3 MPa to 4 MPa.

10. The process of claim 8, wherein the steam based deluge system is operated by feeding pressurized water having a temperature from 140° C. to 220° C. into the protective enclosure.

11. The process of claim 10, wherein water, which has been used as a cooling medium for removing the heat of polymerization from the reaction mixture, is fed into the protective enclosure.

12. The process of claim 10, wherein pressurized water having a temperature from 140° C. to 220° C. is permanently circulated in a closed loop through a pipeline, which is installed from 2 to 20 m above a floor of the protective enclosure and which is equipped with nozzles for releasing the water when a leakage of monomers or of reaction mixture is detected.

13. The process of claim 8, wherein the steam based deluge system is shut down 20 seconds after the water based deluge system has become fully active.

14. The process of claim 1, wherein the monitoring of the production line with respect to an occurrence of a leakage occurs by employing IR open path detectors, IR point detector or ultrasonic detectors, or combinations thereof in a surroundings of the production line or by monitoring reaction conditions.

15. The process of claim 1, wherein an emergency pressure release program is automatically started in parallel with the water based deluge system.

16. A process for polymerizing or copolymerizing one or more ethylenically unsaturated monomers at temperatures from 100° C. to 350° C. and pressures in the range of from 110 MPa to 500 MPa in a production line comprising a continuously operated polymerization reactor,
wherein polymerizing or copolymerizing is carried out in a production line in which the monomers are brought to polymerization pressure by one or more compressors in a sequence of compression stages in which the compressed gas mixture is cooled after each compression stage by a compression stage cooler, the compressed monomers are optionally passed through a pre-heater or a pre-cooler, and transferred into the polymerization reactor which is optionally cooled by cooling jackets, a reaction mixture obtained by the polymerization or copolymerization is leaving the polymerization reactor through a pressure control valve and optionally cooled by an post reactor cooler, the reaction mixture is separated into polymeric and gaseous components in two or more stages, where the gaseous components separated off in a first stage at an absolute pressure of from 15 MPa to 50 MPa are recycled to the one or more compressors via a high-pressure gas recycle line, and the gaseous components separated off in a second stage at an absolute pressure in the range of from 0.1 to 0.5 MPa are recycled to the first stage of the sequence of compression stages via a low-pressure gas recycle line, and the polymeric components obtained by the polymerization are transformed into pellets, and the polymerization reactor, the pressure control valve, a high-pressure product separator and, if present, the pre-heater or pre-cooler and the post reactor cooler are installed within a protective enclosure the process comprising
monitoring the production line with respect to an occurrence of a leakage of monomers or of reaction mixture, and
automatically starting a water based deluge system, which provides droplets of a diameter in a range from 25 µm to 20 mm to an enclosed area when a leakage of monomers or of reaction mixture is detected, and the droplets are provided with a minimum flow rate of 10 L/min per m² of enclosed area.

17. The process of claim 16, wherein a steam based deluge system is started automatically in parallel with the water based deluge system.

18. The process of claim 17, wherein the steam based deluge system is operated by a feeding steam having a pressure from 0.3 MPa to 4 MPa.

19. The process of claim 17, wherein the steam based deluge system is operated by feeding pressurized water into the protective enclosure, wherein the water has a temperature from 140° C. to 220° C. and has been used as a cooling medium for removing the heat of polymerization from the reaction mixture.

20. The process of claim 16, wherein an emergency pressure release program is automatically started in parallel with the water based deluge system.

* * * * *

UNITED STATES PATENT AND TRADEMARK OFFICE
CERTIFICATE OF CORRECTION

PATENT NO. : 10,472,428 B2
APPLICATION NO. : 16/300177
DATED : November 12, 2019
INVENTOR(S) : Gonioukh et al.

It is certified that error appears in the above-identified patent and that said Letters Patent is hereby corrected as shown below:

On the Title Page

Item (54) Column 1, Line 3, delete "CARRED" and insert -- CARRIED --

In the Specification

In Column 1, Line 3, delete "CARRED" and insert -- CARRIED --

In Column 1, Line 7, after "HIGH-PRESSURE POLYMERIZATION PROCESS OF ETHYLENICALLY UNSATURATED MONOMERS CARRED OUT IN A POLYMERIZATION REACTOR INSTALLED WITHIN A PROTECTIVE ENCLOSURE" insert -- This application is the U.S. National Phase of PCT International Application PCT/EP2017/060975, filed May 9, 2017, claiming benefit of priority to European Patent Application No. 16168994.8, filed May 10, 2016, the disclosures of which are incorporated herein by reference in their entirety. --

In Column 7, Line 49, delete "1800" and insert -- 180° --

In Column 8, Line 53, after "operated in" insert -- a --

In Column 8, Line 63, delete "1800" and insert -- 180° --

In Column 10, Line 24, delete "1800" and insert -- 180° --

In Column 12, Line 3, delete "25 m" and insert -- 25 µm --

In Column 12, Line 6, delete "25 m" and insert -- 25 µm --

In Column 12, Line 9, delete "200 m" and insert -- 200 µm --

In Column 12, Line 11, delete "300 m" and insert -- 300 µm --

Signed and Sealed this
Fifth Day of July, 2022

*Katherine Kelly Vidal*
Katherine Kelly Vidal
*Director of the United States Patent and Trademark Office*

CERTIFICATE OF CORRECTION (continued)
U.S. Pat. No. 10,472,428 B2

In Column 12, Line 47, delete "25 m to 200 m" and insert -- 25 µm to 200 µm --

In Column 15, Line 10, delete "efrom" and insert -- from --

In Column 19, Line 23, delete "by" and insert -- be --